United States Patent [19]

Hoizumi et al.

[11] Patent Number: 5,044,152
[45] Date of Patent: Sep. 3, 1991

[54] METHOD OF OPERATING A COMBINED PLANT

[75] Inventors: Shinichi Hoizumi; Yoshiki Noguchi; Tadao Arakawa; Kazusada Hoshino, all of Hitachi, Japan

[73] Assignee: Hitachi, Ltd., Tokyo, Japan

[21] Appl. No.: 348,776

[22] Filed: May 8, 1989

[30] Foreign Application Priority Data

May 11, 1988 [JP] Japan ................... 63-112448

[51] Int. Cl.$^5$ ............................................. F02C 6/18
[52] U.S. Cl. ................................. 60/39.03; 60/39.182
[58] Field of Search ............... 60/39.02, 39.03, 39.182, 60/39.29

[56] References Cited

U.S. PATENT DOCUMENTS

| | | | |
|---|---|---|---|
| 3,974,645 | 8/1976 | Smith | 60/39.29 |
| 4,028,884 | 6/1977 | Martz et al. | 60/39.182 |
| 4,175,382 | 11/1979 | Pfenninger | 60/39.182 |
| 4,578,944 | 4/1986 | Martens et al. | 60/39.182 |

FOREIGN PATENT DOCUMENTS 17967 5/1985 Japan .
34322 2/1986 Japan .

Primary Examiner—Louis J. Casaregola
Attorney, Agent, or Firm—Antonelli, Terry, Stout & Kraus

[57] ABSTRACT

A method of operating a combined plant which is composed of a gas turbine system including a compressor into which air is introduced through an inlet guide vane, a combustor in which a fuel is burnt with the air compressed by the compressor, and a turbine into which the combustion gas is introduced to generate an output power, a waste-heat recovery boiler which generates steam by the heat possessed by the combustion exhaust gas from the gas turbine system and a steam turbine driven by the steam generated by the waste heat recovery boiler. The opening of the inlet guide vane of the gas turbine system is controlled in accordance with the state of the waste-heat recovery boiler or the steam turbine, such as the temperature of the steam introduced into the steam turbine, thermal stress generated in the steam turbine, temperature of a metallic part of the steam turbine and so forth.

3 Claims, 21 Drawing Sheets

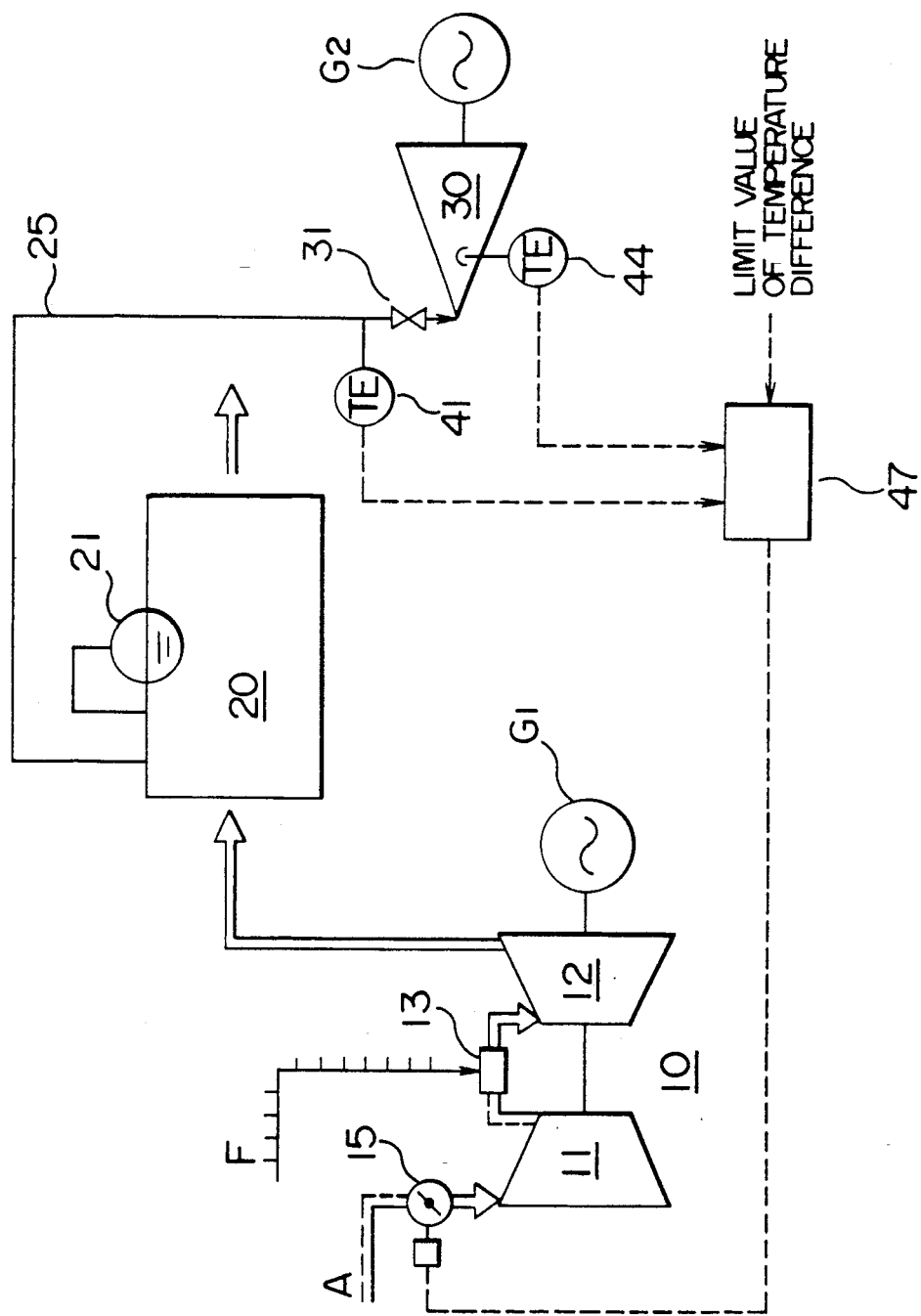

START MODE

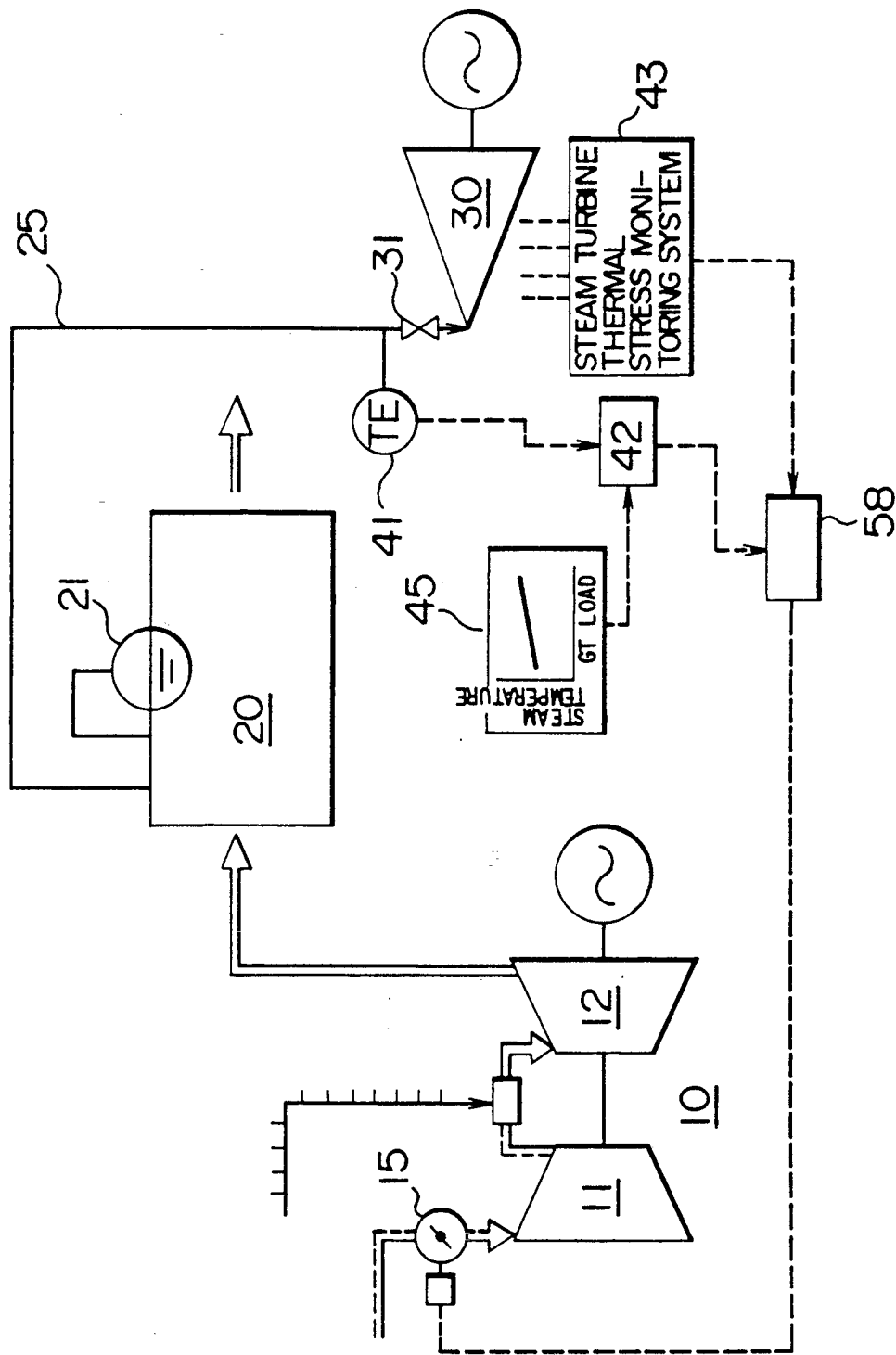

METHOD OF OPERATING A COMBINED PLANT

BACKGROUND OF THE INVENTION

The present invention relates to a method of and a system for operating a combined plant which is composed of a gas turbine, a waste-heat recovery boiler and a steam turbine and more particularly, to a method of and a system for operating a combined plant by making use of inlet guide vanes of the gas turbine.

Japanese Patent Examined Publication No. 60-17967 proposes a combined plant composed of a gas turbine, a waste-heat recovery boiler for collecting heat possessed by the exhaust gas from the gas turbine, and a steam turbine driven by the steam generated by the waste-heat recovery boiler. It is known that the temperature of the exhaust gas from the gas turbine is highest when the gas turbine operates with about 80% load and that the temperature of the steam generated by the waste-heat recovery boiler exhibits almost the same tendency.

The highest exhaust gas temperature from the gas turbine at about 80% load is attributable to the fact that, in general, the rate of introduction of air into the gas turbine is controlled when the load level has reached about 80% so as to prevent the combustion temperature in the gas turbine from increasing beyond a predetermined limit which is determined for the purpose of protecting the gas turbine blades and other parts from heat.

In operation of a gas turbine, air is introduced into a compressor through inlet guide vanes and the air compressed by the compressor is introduced into a combustion chamber together with a fuel so as to burn the fuel. The combustion gas generated as a result of the combustion drives the impeller of the gas turbine which produces driving power to drive the compressor and a load such as an alternator. During the operation of the gas turbine, the opening degree of the inlet guide vanes is controlled in the following manner.

FIGS. 2A-2D are graphical illustrations of operation factors of a combined plant such as temperatures of various portions of the combined plant, air flow rate, opening degree of the inlet guide vanes, and so forth, in relation to the load applied to the gas turbine. As shown in FIG. 2A, the inlet guide vane opening is maintained constant when the load on the gas turbine is 80% or less, so that the flow rate of the air at the compressor inlet is constant. It will be understood that the gas turbine which drives an alternator operates at a constant rotation regardless of a change in the load so that the flow rate of air taken into the compressor is also maintained constant insofar as the inlet guide vane opening is kept constant. On the other hand, the supply of the fuel into a gas turbine is determined in proportion to the level of the load so that the air excess ratio increases as the load level becomes lower. Consequently, the combustion temperature becomes lower because the turbine is cooled by excess air, as shown in FIG. 2C, with the result that the exhaust gas temperature from the gas turbine, as well as the steam temperature, becomes lower as shown in FIG. 2D. In general, the combustion temperature in the gas turbine reaches the maximum allowable temperature Tmax when the load on the turbine is increased to about 80%. In order to protect the parts of the combustion chamber and the turbine, it is not permissable to raise the temperature beyond the level of the maximum allowable combustion temperature. Therefore, when the gas turbine operates with a load exceeding 80%, the opening of the guide vanes is increased to allow a greater amount of air to be introduced so as to cool the gas turbine thereby maintaining the temperature below the maximum allowable temperature. Consequently, the exhaust gas temperature and, hence, the steam temperature exhibits peaks when the load is around 80% load.

This fact will be more easily understood from the following description taken in conjunction with the entropy graph of FIG. 3. Wherein A represents the state of air at the compressor inlet, $B_1$ and $B_2$ represent the state of air at the compressor outlet, $C_1$ and $C_2$ represent the state of the combustion gas at the combustion chamber outlet and $D_1$ and $D_2$ represent the state of the gas at the turbine outlet, respectively, in terms of entropy and temperature. Lines $B_1$-$C_1$, $B_2$-$C_2$, and A-$D_1$-$D_2$ are constant pressure lines. The solid line shows the cycle ($A$-$B_1$-$C_1$-$D_1$-$A$) performed when the gas turbine operates at 100% load with the inlet guide vane opening increased to allow a large quantity of air to be introduced to the compressor, while the broken line shows the cycle ($A$-$B_2$-$C_2$-$D_2$-$A$) performed when the gas turbine operates at 80% load with the guide vane opening restricted to allow a smaller quantity of air to be introduced into the gas turbine. As shown in FIG. 3, a high temperature of the exhaust gas from the turbine is obtained by controlling the inlet guide opening such that the combustion temperature in the gas turbine does not exceed the allowable maximum temperature Tmax at each load level.

Thus, the temperature of the exhaust gas varies along a curve which is upwardly convexed as a result of the control of the airflow rate for the purpose of protecting the gas turbine and the steam temperature characteristic of the waste heat recovery boiler which is designed to maximize the heat recovery efficiency exhibits the same tendency, as shown in FIG. 2B.

In general, a combined plant is required to start and stop very frequently because it can be started rapidly and operate with a varying load at high efficiency. The upwardly convexed curve of the steam temperature characteristic, i.e., the presence of a peak, means that the generation of thermal stress in the steam turbine is very severe. For instance, the difference between the steam temperature during operation of the gas turbine at 80% load and that during operation at 100% load is 25° to 30° C. Such a change in the load level on the gas turbine is finished in quite a short period of time, e.g., several minutes.

Thus, the operation of the gas turbine in a combined plant has to be controlled taking into account also the conditions of the steam/water side of the plant.

SUMMARY OF THE INVENTION

Accordingly, an object of the present invention is to provide a method of operating a combined plant, in which inlet guide vane opening of the gas turbine is controlled taking into account also the conditions in the steam/water side of the combined plant.

To this end, according to the present invention, the inlet guide vane opening of the gas turbine of a combined plant is controllable in accordance with the state of operation of the steam/water side of the combined plant so as to maintain the temperature of the exhaust gas from the gas turbine or the temperature of the steam generated by the waste heat recovery boiler at a command level.

According to the invention, therefore, the flow rate of the air flowing into the compressor is freely controlled by varying the inlet guide vane opening of the gas turbine. For instance, when the opening of the inlet guide vane is restricted to reduce the flow rate of the air flowing into the compressor, the pressure of air at the compressor outlet is decreased from the solid line to the broken line in FIG. 3, with the result being that the exhaust gas temperature of the gas turbine is increased. The graph in FIG. 3 is based on an assumption that the combustion temperature is constant. The reduction in the airflow rate, therefore, means a reduction in the load level. Conversely, if the load level is fixed, it is necessary to raise the combustion temperature, which, in turn, causes a further rise of the exhaust gas temperature. The above-described control of the exhaust gas temperature enables the control of the temperature of steam generated in the waste-heat recovery boiler which makes use of the heat possessed by the exhaust gas emitted from the gas turbine. Thus, the present invention enables, through a control of the inlet guide vane opening of the gas turbine, a free control of the steam temperature which, in turn, enhances the degree of freedom of the steam temperature.

BRIEF DESCRIPTION OF THE DRAWINGS

FIG. 9 is a schematic view of yet another embodiment of the present invention in which the inlet guide vane opening is controlled in accordance with the difference between the steam temperature and the turbine metal temperature;

FIGS. 19 and 20 are schematic views of different embodiments of the present invention.

Referring now to the drawings wherein in like reference numerals are used throughout the various views to designate like parts and, more particularly, to FIG. 1, according to this Figure a combined plant has as includes a gas turbine 10, a waste-heat recovery boiler 20 for generating steam by the heat possessed by the exhaust gas from the gas turbine 10, and a steam turbine 30 driven by the steam generated by the waste-heat recovery boiler 20. A thermometer 41, provided in a steam line 25 between the waste-heat recovery boiler 20 and the steam turbine 30, is capable of measuring the steam temperature and delivering a signal to a controller 42 which, in turn, produces a signal for controlling the inlet guide vane 15 of the compressor 11 so as to control the flow rate of air introduced into the compressor 11 in such a manner that the steam temperature coincides with a predetermined command temperature set by a load-temperature setting device 45. In FIG. 1, air flow and a fuel-flow are represented by A and F, respectively with reference numerals 13 and 21 denoting a combustor and a steam generator and symbols $G_1$ and $G_2$ representing generators.

The output function set in the load-temperature setting device 45 can be varied in various manners in accordance with the purposes of controlling. An example of such a function will be explained later in connection with FIGS. 4A, 4B. The controller 42 is capable of controlling the degree of opening of the inlet guide vane 15 in accordance with the deviation of the output of the thermometer 41 from the output of the load-temperature setting device 45. If the opening of the inlet guide vane 15 is reduced, the flow rate of air flowing into the compressor is decreased so that a higher steam temperature is obtained for the same level of the load. Conversely, a comparatively low steam temperature is obtained by increasing the opening of the inlet guide vane 15.

Figure 4A:
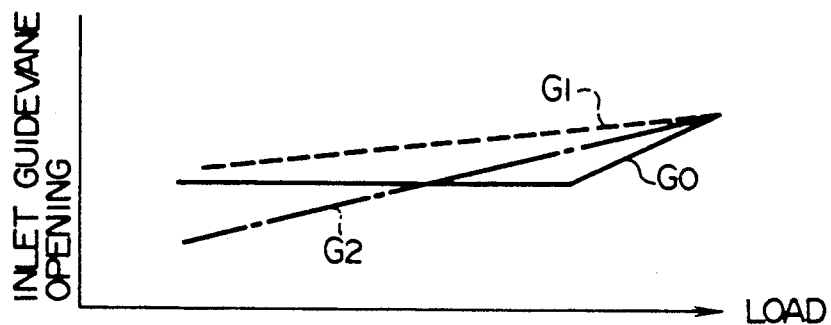
FIGS. 4A and 4B are graphical illustrations of the operation of the embodiment shown in FIG. 1.
Figure 4B:
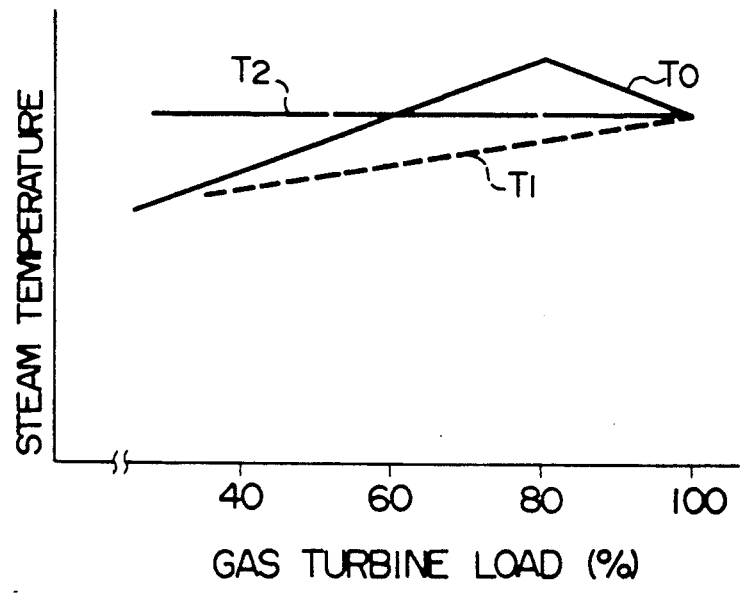

FIGS. 4A and 4B illustrate an example of the function set in the load-temperature setting device 45. Symbols $G_0$ and $T_0$ represent, respectively, the opening of the inlet guide vane set in the conventional system and steam temperature obtained with this system. A substantially straight line $T_2$ represents the temperature characteristic as obtained when the control is performed in such a manner as to avoid generation of a peak thereby realizing a substantially uniform steam temperature over the entire range of the load. In such a case, the opening of the inlet guide vane 15 is controlled in a manner represented by $G_2$. When the steam temperature is changed in proportion to the load level as represented by $T_1$, the inlet guide vane is controlled in a manner represented by $G_1$. Thus, a feedback of the steam temperature is executed in accordance with the steam temperature function such as $T_1$ and $T_2$ shown in FIG. 4B. However, there is a risk that the combustion temperature in the gas turbine exceeds a predetermined maximum allowable temperature Tmax as a result of control of the gas turbine fuel performed by a control system (not shown) or due to other disturbance. In order to avoid such an inconvenience, it is effective to give a priority to a combustion heat protection system rather than to the steam temperature feedback system so that protection takes preference over the feedback control so as to lower the combustion temperature. For example, the combustion heat protection system functions to compute the combustion temperature from the air pressure at the compressor outlet and the gas temperature at the gas turbine outlet and to compare the computed combustion temperature with a predetermined maximum allowable temperature, and is capable of operating to lower the combustion temperature depending on the result of the comparison.

In the control of the steam temperature, a reduction in the steam temperature may be effected by spraying water to the steam generated by the waste heat recovery boiler 20. This method, however, results in a significant reduction in the thermal efficiency of the plant. On the other hand, a rise in the steam temperature may be effected by an auxiliary burning system in the waste-heat recovery boiler 20. This may lead to a considerable rise in the production cost and require a complicated construction of the system.

Figure 1:
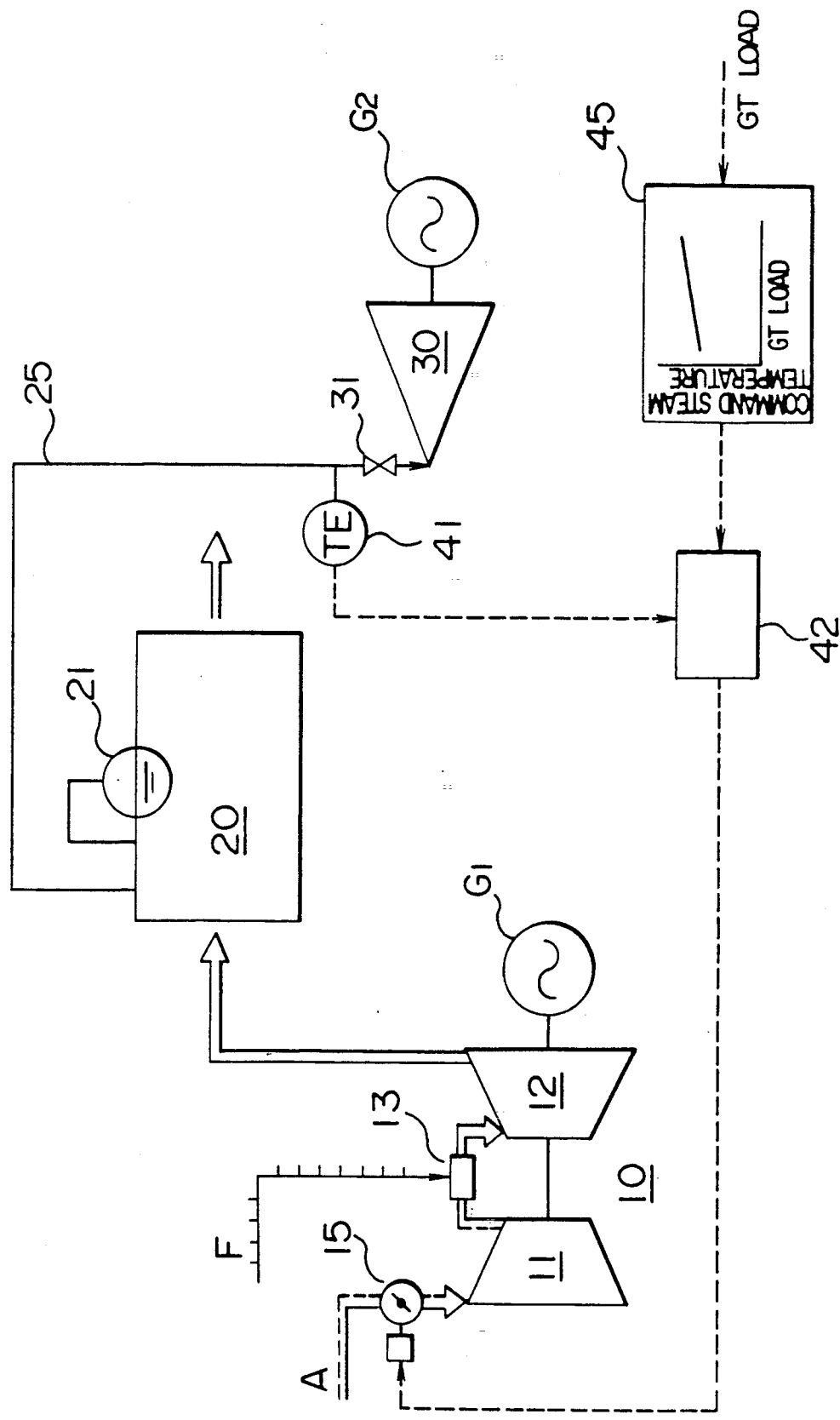
FIG. 1 is a schematic view of an embodiment of the present invention, in which the steam temperature is set in accordance with the level of the load on the gas turbine and the inlet guide vane opening is controlled in accordance with the set steam temperature.

In the embodiment shown in FIG. 1, the temperature of the steam flowing into the steam turbine 30 of the combined plant can be controlled freely by the inlet guide vane 15 of the gas turbine 20. This effectively increases the service life of the plant as compared with the prior art constructions by suppressing a large thermal stress in the waste-heat recovery boiler 20 and the steam turbine 30 as a result of a drastic change in the steam temperature experienced when the plant is started up or when the load level is changed.

Figure 5:
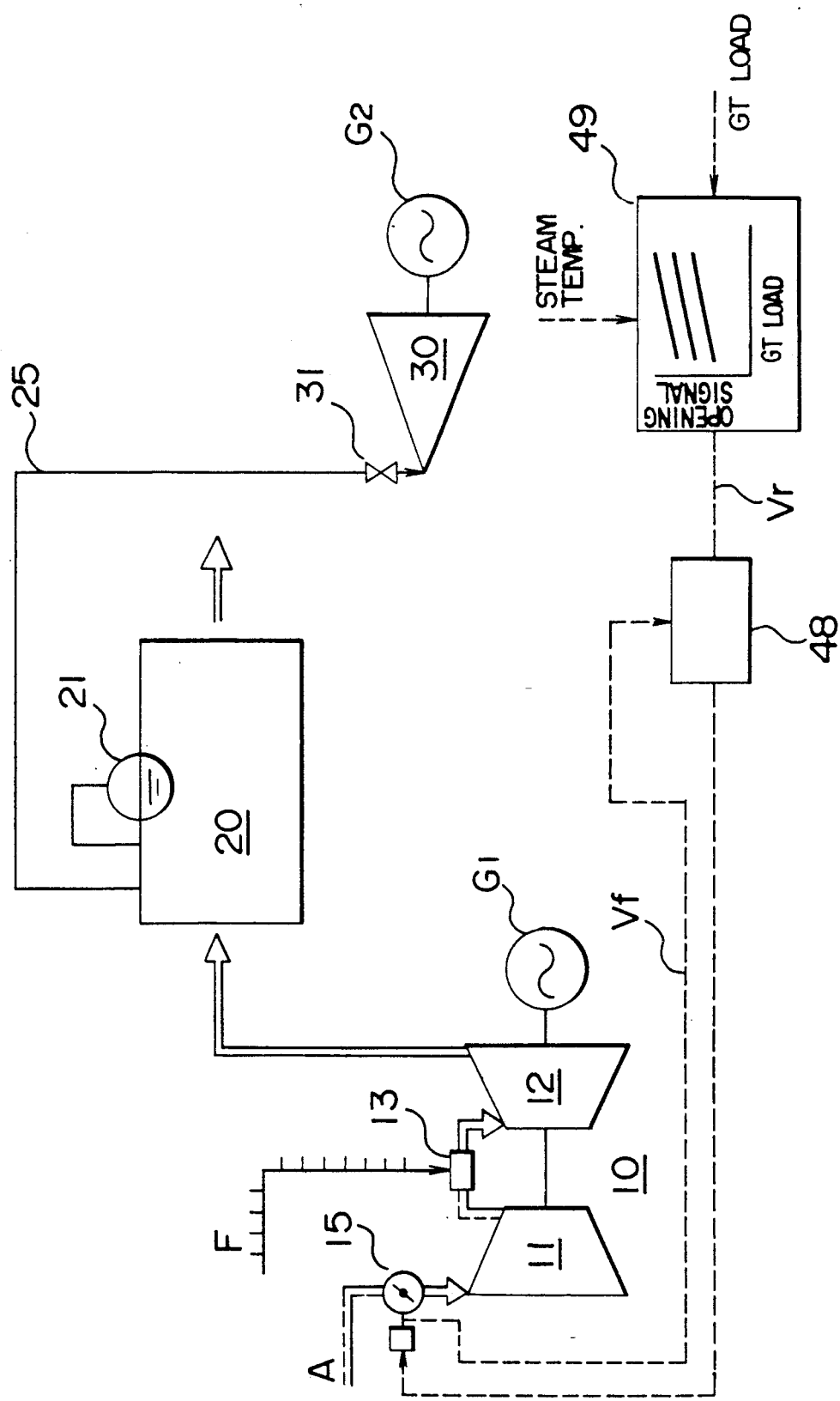
FIG. 5 is a schematic view of a modification of the embodiment of FIG. 1.
Figure 6:
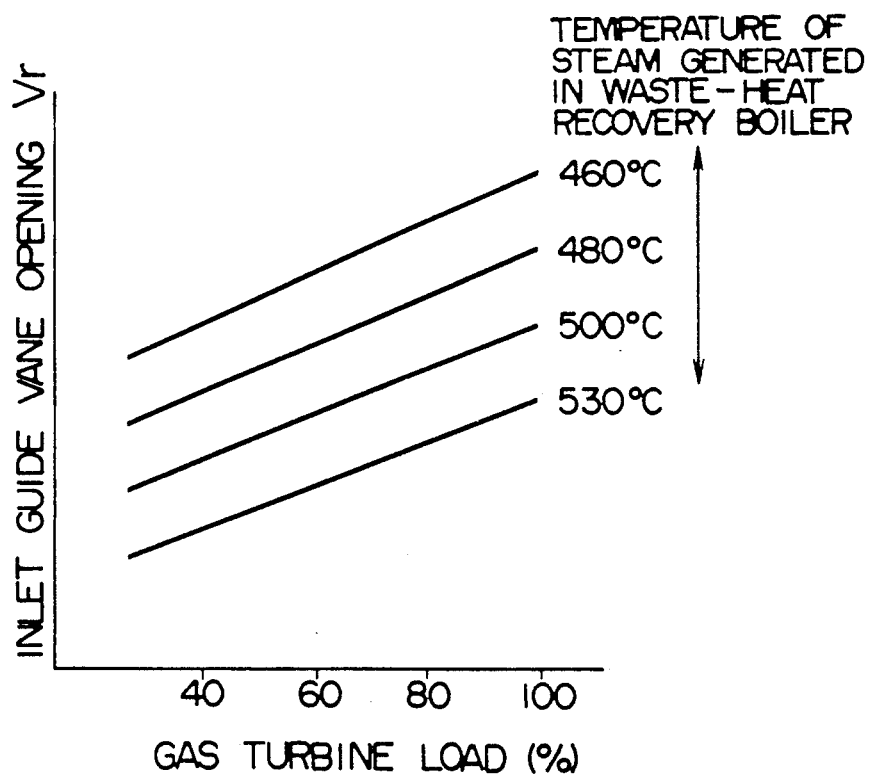
FIG. 6 is a graphical illustration of a function set in a load-temperature setting device.

In FIG. 5, the function generator 49 is capable of generating a command signal Vr for the inlet guide vane opening corresponding to the level of the load applied to the gas turbine and the temperature of the steam generated in the waste-heat recovery boiler, as shown in FIG. 6. Namely, the inlet guide vane opening command signal Vr is generated in accordance with the momentary load signal with respect to a command steam opening temperature. Upon receipt of the inlet guide vane opening command signal Vr, the controller 48 controls the inlet guide vane opening using a signal Vf fed back thereto and representative of the actual opening of the inlet guide vane.

Figure 7:
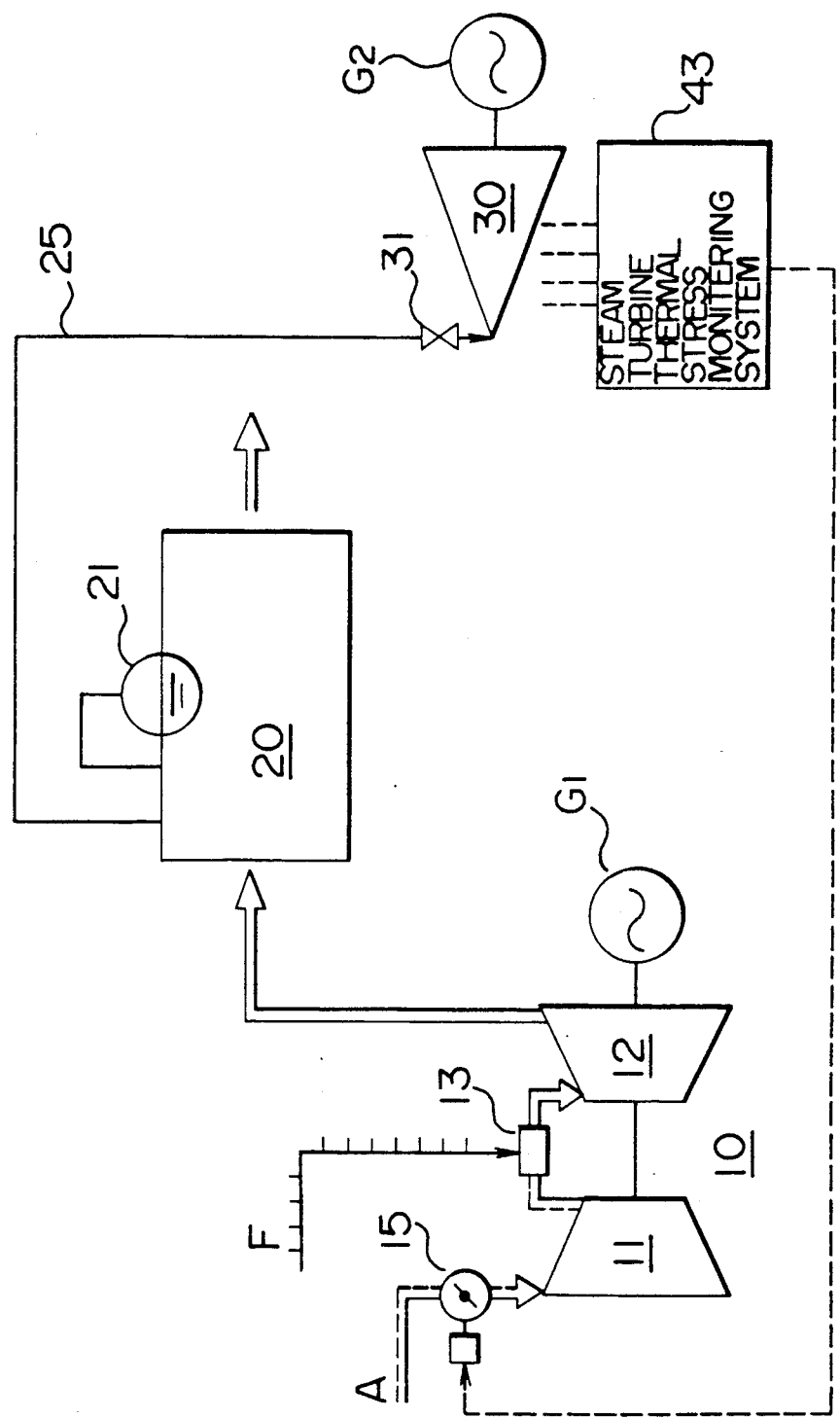
FIG. 7 is a schematic view of another embodiment of the present invention in which the inlet guide vane opening of the gas turbine is controlled in accordance with the thermal stress in the gas turbine.

In the embodiment of FIG. 7, the thermal stress generated in the steam turbine 30 is monitored by the steam turbine thermal stress monitoring system 43 so as to control the opening of the inlet guide vane 15 in such a manner as to substantially eliminate or minimize the generation of thermal stress in the combined plant throughout the period of operation of the same including the period of start up and transient period in which the load level is changed.

Various known systems are usable as the steam turbine thermal stress monitoring system. Methods are also usable for the purpose of determination of the thermal stress. For example, the thermal stress maybe determined on the basis of the temperature difference between the metals inside and outside the turbine casing. It is also possible to predict or assume the turbine rotor metal temperature from the conditions, i.e., the temperature, pressure and the flow-rate, of the steam flowing into the turbine. The control of the thermal stress may be effected in such a manner that the computed thermal stress is maintained below the level of a predetermined limit or that the computed thermal stress coincides with a predetermined level.

Figure 2A:
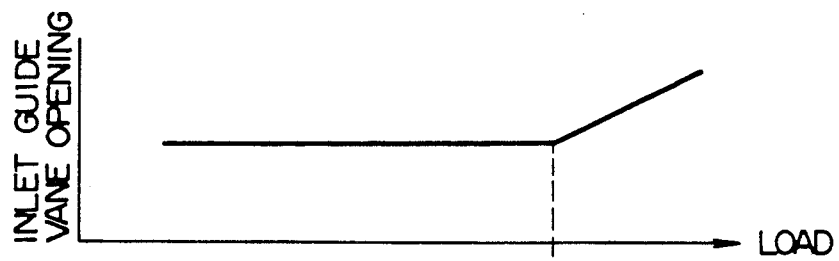
FIGS. 2A-2D and 3 are a graphical illustrations explanatory of peaking of the temperature of the exhaust gas from a gas turbine.
Figure 2B:
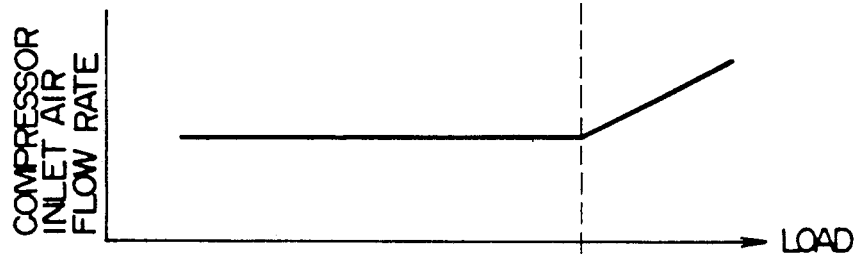
Figure 2C:
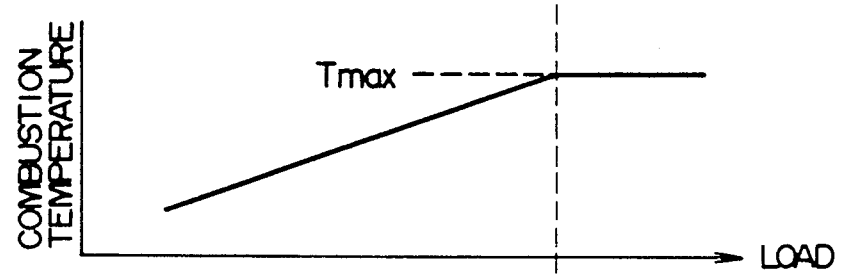
Figure 2D:
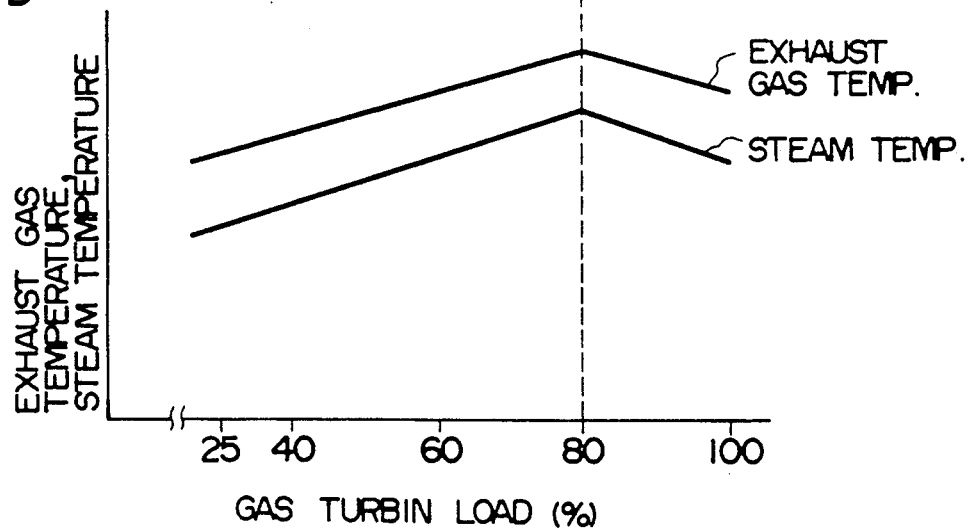
Figure 3:
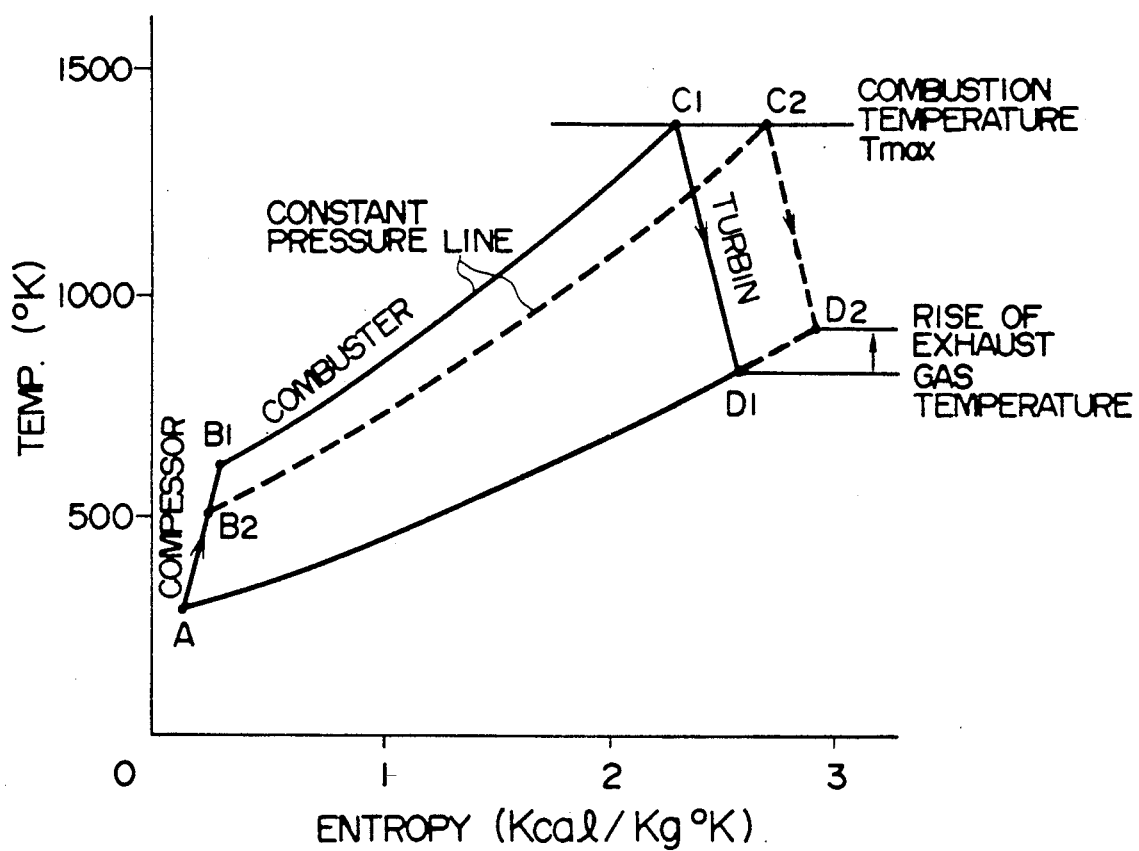
Figure 8A:
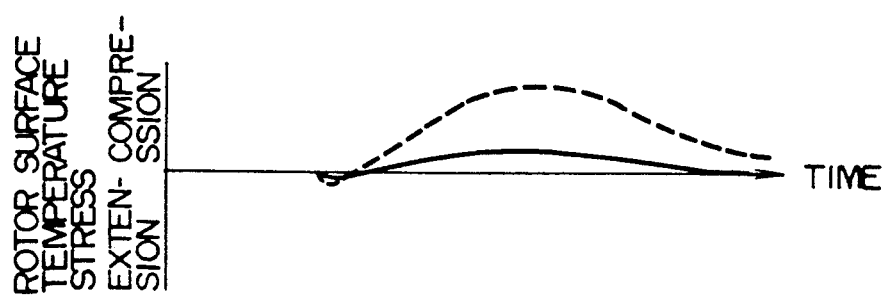
FIGS. 8A-8C are graphical illustrations of operation of the embodiment of FIG. 7.
Figure 8B:
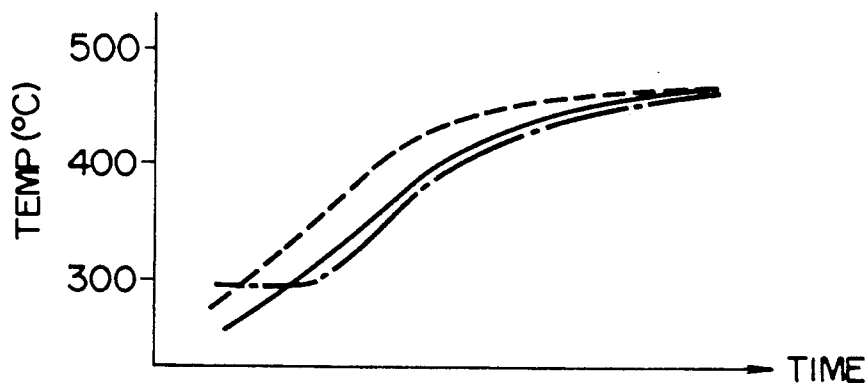
Figure 8C:
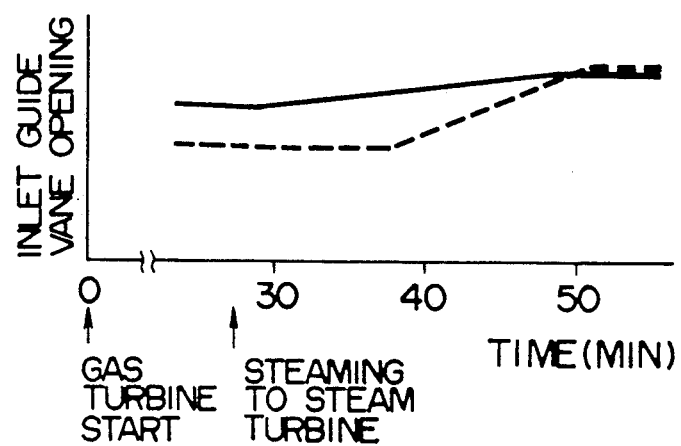

FIG. 8A shows the thermal stress occurring in the rotor surface, FIG. 8B shows the temperature of steam introduced into the steam turbine and FIG. 8C shows the inlet guide vane opening as observed when a combined plant is started up, wherein broken-line curves show the characteristic as obtained when the plant is started up in accordance with a control pattern of the inlet guide vane as shown in FIG. 2A, while the solid-line curve show the characteristics as obtained when the plant is started up in accordance with the output from the steam turbine thermal stress monitoring system 43 shown in FIG. 7. A chain-line curve in FIG. 8B represents the turbine rotor metal temperature. As will be seen from FIGS. 8A–8C, particularly from FIG. 8C, the inlet guide vane is set at a greater opening in this embodiment than in the conventional system when the combined plant is started up, so that a greater quantity of air is introduced so as to lower the temperature of steam generated by the waste-heat recovery boiler as shown in FIG. 8B so that the steam temperature becomes closer to the rotor metal temperature, with the result being that the thermal stress generated in the rotor is decreased correspondingly. According to the embodiment shown in FIG. 7, it is thus possible to directly control the thermal stress generated in the steam turbine 30, through monitoring of the thermal stress.

FIG. 9, the temperature of the steam flowing into the steam turbine 30 is measured by a thermometer 41, while the turbine metal temperature is measured by a thermometer 44. Upon receipt of the signals from the thermometers 41, 44 the controller 47 produces a signal for controlling the opening of the inlet guide vane 15 in such a manner so as to maintain the difference between the temperatures measured by the thermometers 41, 44 less than a predetermined value. The measurement of the temperature of the steam flowing into the steam turbine, performed by the thermometer 41, may be substituted by measurement of the steam temperature after the initial stage of the steam turbine 30. According to this embodiment, it is possible to materially limit the thermal stress occurring in the steam turbine 30, by minimizing the difference between the steam temperature and the metal temperature.

Figure 10:
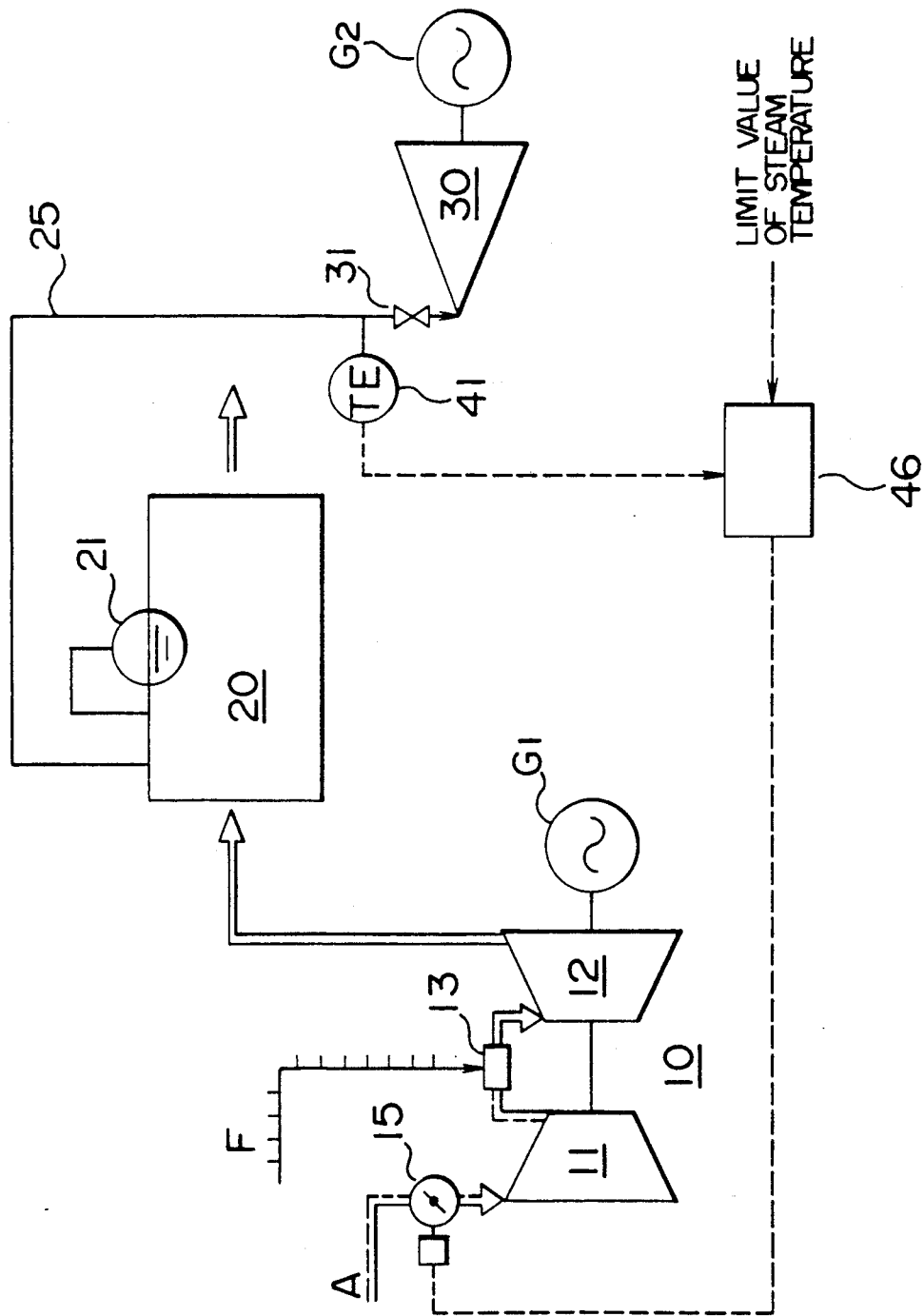
FIG. 10 is a schematic view of a further embodiment of the present invention in which the inlet guide vane opening is controlled so as to maintain the steam temperature below a predetermined limit temperature.
Figure 11A:
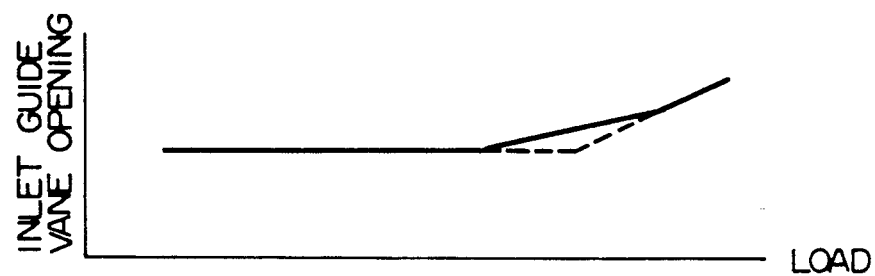
FIGS. 11A and 11B are graphical illustrations of the operation of the embodiment of FIG. 10.
Figure 11B:
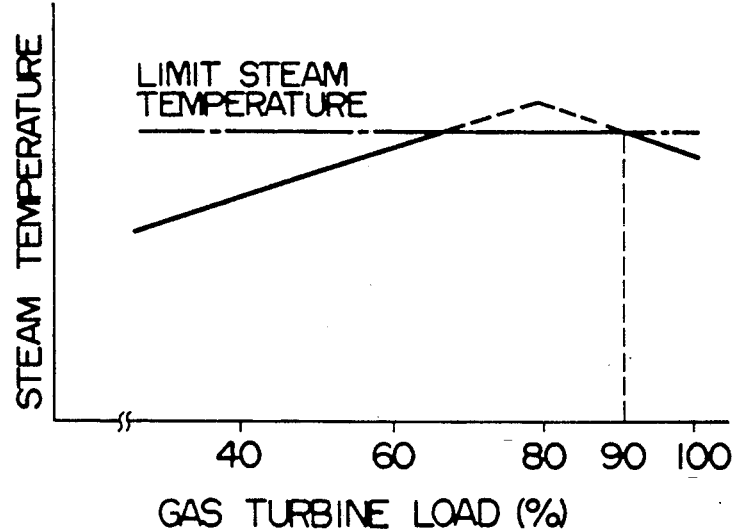

In FIG. 10, the temperature of the steam flowing into the steam turbine 30 is measured by the thermometer 41 and the opening of the inlet guide vane 15 is controlled such that the steam temperature does not exceed a predetermined limit value. FIGS. 11A and 11B illustrate the manner in which the opening of the inlet guide vane is controlled such that the temperature of the steam generated by the waste-heat recovery boiler 20 does not exceed a predetermined upper limit level which is set at the same level as the steam temperature obtained when the gas turbine operates with 90% load. According to this embodiment, the temperature of the steam generated by the waste-heat recovery boiler 20 can be maintained within a range which ensures safe operation of the plant, by quite a simple controlling method. In FIG. 11A-11B, FIG. 11B shows the manner in which the inlet guide vane opening is changed, while FIG. 11B shows the steam temperature. In FIG. 11A and 11B, the solid line curve shows the characteristic as obtained when the control is performed by the system shown in FIG. 10.

Figure 12:
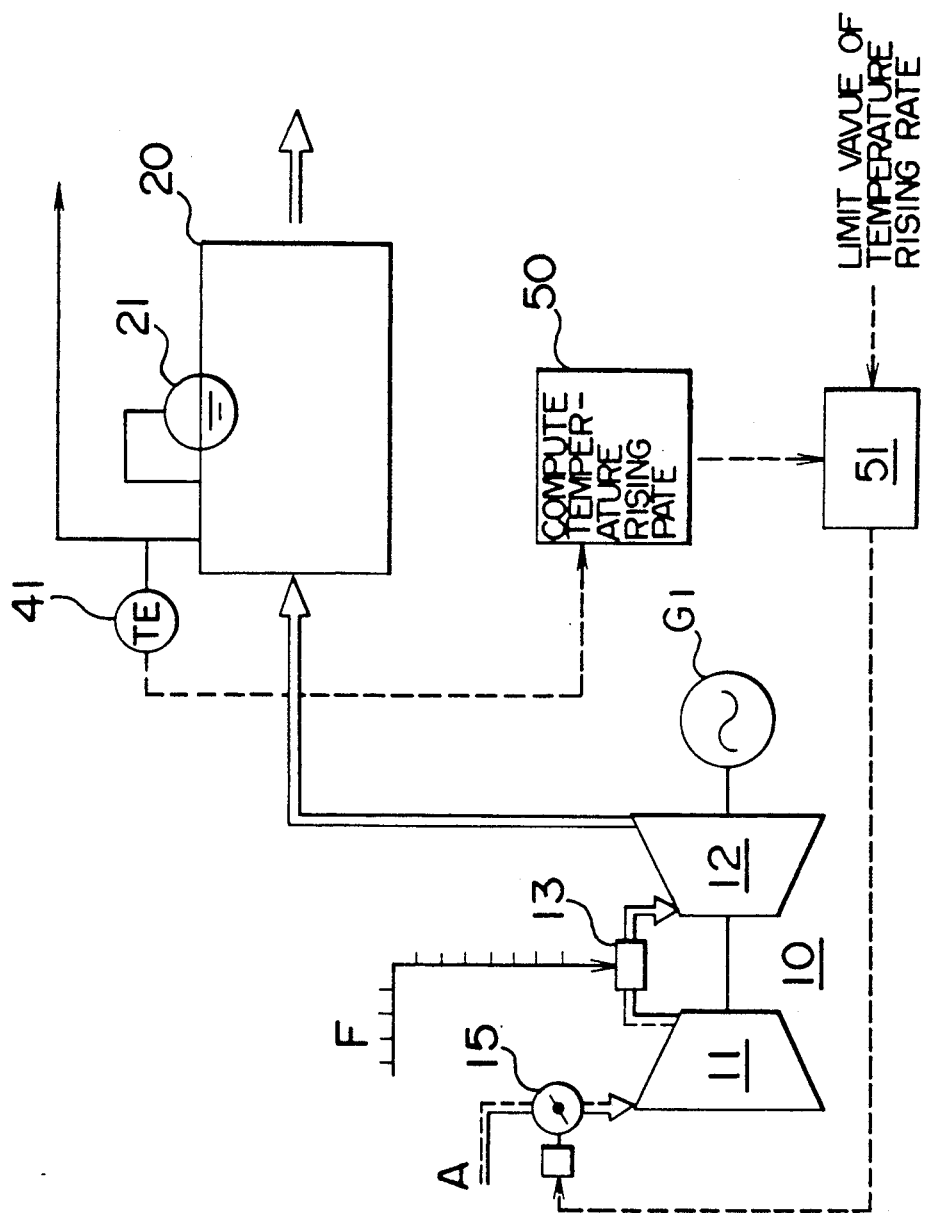
FIG. 12 is a schematic view of a still further embodiment of the present invention in which the inlet guide vane opening is controlled such as to obtain a predetermined value of the rising rate of the steam temperature.

In FIG. 12, the temperature of steam generated by the waste-heat recovery boiler 20 is measured by a thermometer 41 and the rate of change of this steam temperature caused by start-up of the plant or a change in the load level is computed by a changing rate computing section 50. The result of the computation is delivered to a controller 51 which controls the opening of the inlet guide vane 15 such that the changing rate does not exceed a predetermined limit level.

From the foregoing description, it will be understood that the present invention can reduce the level of the thermal stress generated in the waste-heat recovery boiler 20 attributable to a rapid temperature change due to start-up of the plant or a drastic change in the load level, thus ensuring a longer life of the plant.

The measurement of the temperature of the steam generated in the waste-heat recovery boiler may be substituted by computation of the saturated steam temperature corresponding to measured value of the pressure in the steam drum of the waste-heat recovery boiler.

Figure 13:
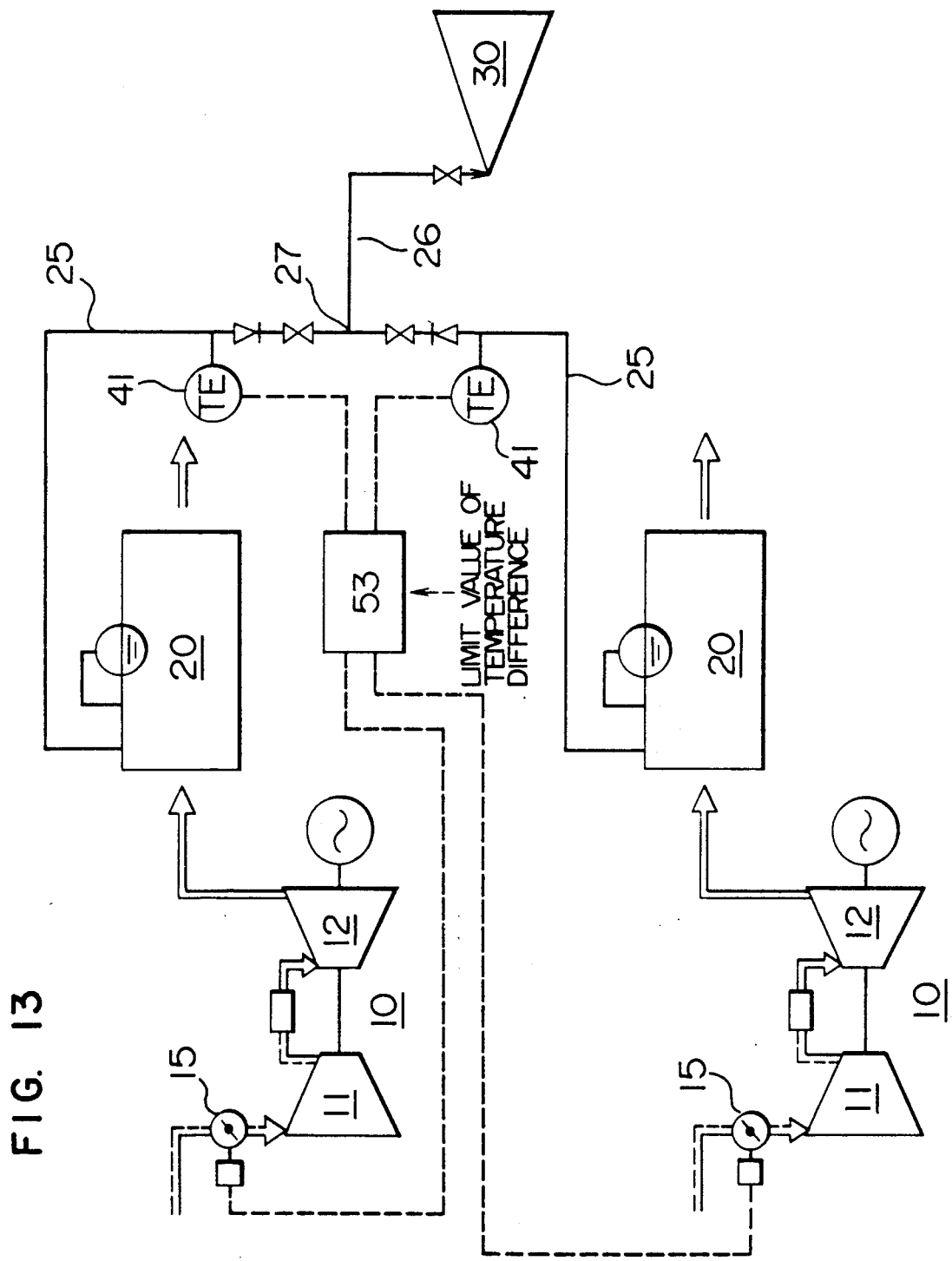
FIG. 13 is a schematic view of yet another embodiment of the present invention in which the inlet guide vane is controlled in such a manner as to maintain the difference between a plurality of steam temperatures in a combined plant.

In FIG. 13 a multiple combined plant is provided having a plurality of gas turbines 10 and a plurality of waste-heat recovery boilers 20 associated therewith. The steam from these boilers 20 is collected into a common steam pipe 26 through steam pipes 25 leading from respective boilers and is then introduced to a steam turbine 30.

Figure 14A:
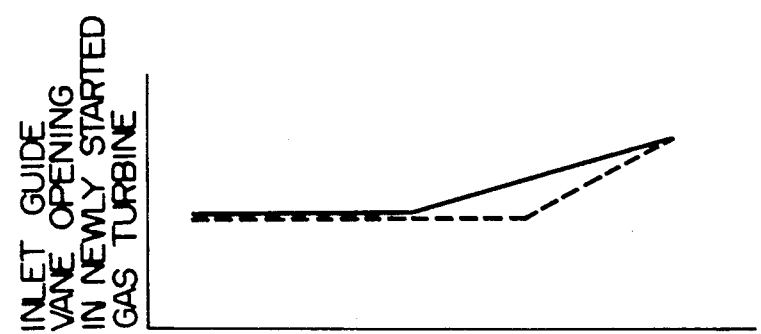
FIGS. 14A and 14B are graphical illustrations of operation of the embodiment of FIG. 13.
Figure 14B:
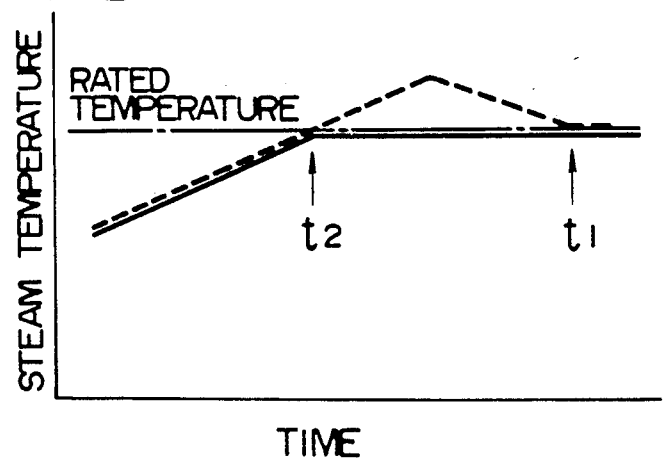

In the multiple combined plant shown in FIG. 13, if a substantial difference exists between the levels of load applied to different gas turbines 10 under operation, corresponding difference is caused between the temperatures of the exhaust gases from different gas turbines and, hence, between the temperatures of steam from different waste-heat recovery boilers, which, in turn, causes a thermal stress to be generated in the steam pipe at the portion 27 where the steam pipes 25 from the waste-heat recovery boilers merge with one another. Such a thermal stress may lead to cracking in the steam pipe particularly when the temperature difference of the steam is large and when the thermal stress is generated frequently. In order to avoid this problem, the plant shown in FIG. 13 employs thermometers 41 provided in the respective steam pipes 25 and capable of delivering signals representative of temperatures of the steam in these pipes 25. The signals from these thermometers are delivered to a controller 53 which controls the opening of the inlet guide vane 15 provided on the gas turbine 10 such that the difference in the steam temperature between these pipes 25 fall below a predetermined limit value. The system shown in FIG. 13 offers the following advantage. Referring to FIG. 14, it is assumed that one of the combinations of a gas turbine and a waste-heat recovery boiler of a multiple combined plant has been operated with a rated load, and another combination of the gas turbine and the waste-heat recovery boiler is going to be started so as to be put into parallel running. According to the conventional technique, the parallel running is accomplished at a moment $t_1$ at which the steam temperature of the newly started waste-heat recovery boiler becomes substantially equal to the steam temperature of the boiler operating at the rated load. According to the embodiment shown in FIG. 13, however, the parallel running can be accomplished at a moment $t_2$ which is earlier than $t_1$. More specifically, solid-line curves in FIGS. 14A and 14B show the inlet guide vane opening of the newly started gas turbine and the temperature of the steam generated by the newly started waste-heat recovery boiler, while chain-line curves illustrate those of the gas turbine/boiler combination which is operated by the conventional operating method. As will be seen from the chain-line curves, when the plant is operated by the conventional method, the steam temperature of the newly started boiler increases to show a peak level and, thereafter, decreases so as to be settled at the rated level. In order that the flows of steam from both boilers are allowed to merge in each other without any substantial mismatch of the temperature, therefore, the connection of two steam lines to each other is carried out only after the steam temperature of the newly started boiler has been settled, i.e., after elapse of a considerably long time from the time at which the steam temperature has reached the peak level. In contrast, according to the embodiment of the present invention, the newly started boiler can be put into parallel running at the moment at which the rated temperature is reached, by controlling the inlet guide vane opening in a manner shown in FIG. 14A. The control of the inlet guide vane 15 need not always be conducted on all the gas turbines included in the multiple combined plant. Namely, the arrangement may be such that the control of the inlet guide vane opening is conducted on one or more of the gas turbines in a multiple combined plant so as to control the steam temperature of one or more of waste-heat recovery boilers associated with these gas turbines, using as a reference the steam temperature of a waste-heat recovery boiler connected to one of the gas turbines of the multiple combined plant. The same effect can be obtained by operating the plant such that the inlet guide vane of the newly started gas turbine is controlled in such a manner that the steam temperature of the waste-heat recovery boiler associated with the newly started gas turbine coincides with the steam temperature in the waste-heat recovery boiler operating at the rated load or falls within a predetermined range around a reference temperature which is the steam temperature of the boiler operating at the rated load.

Figure 15:
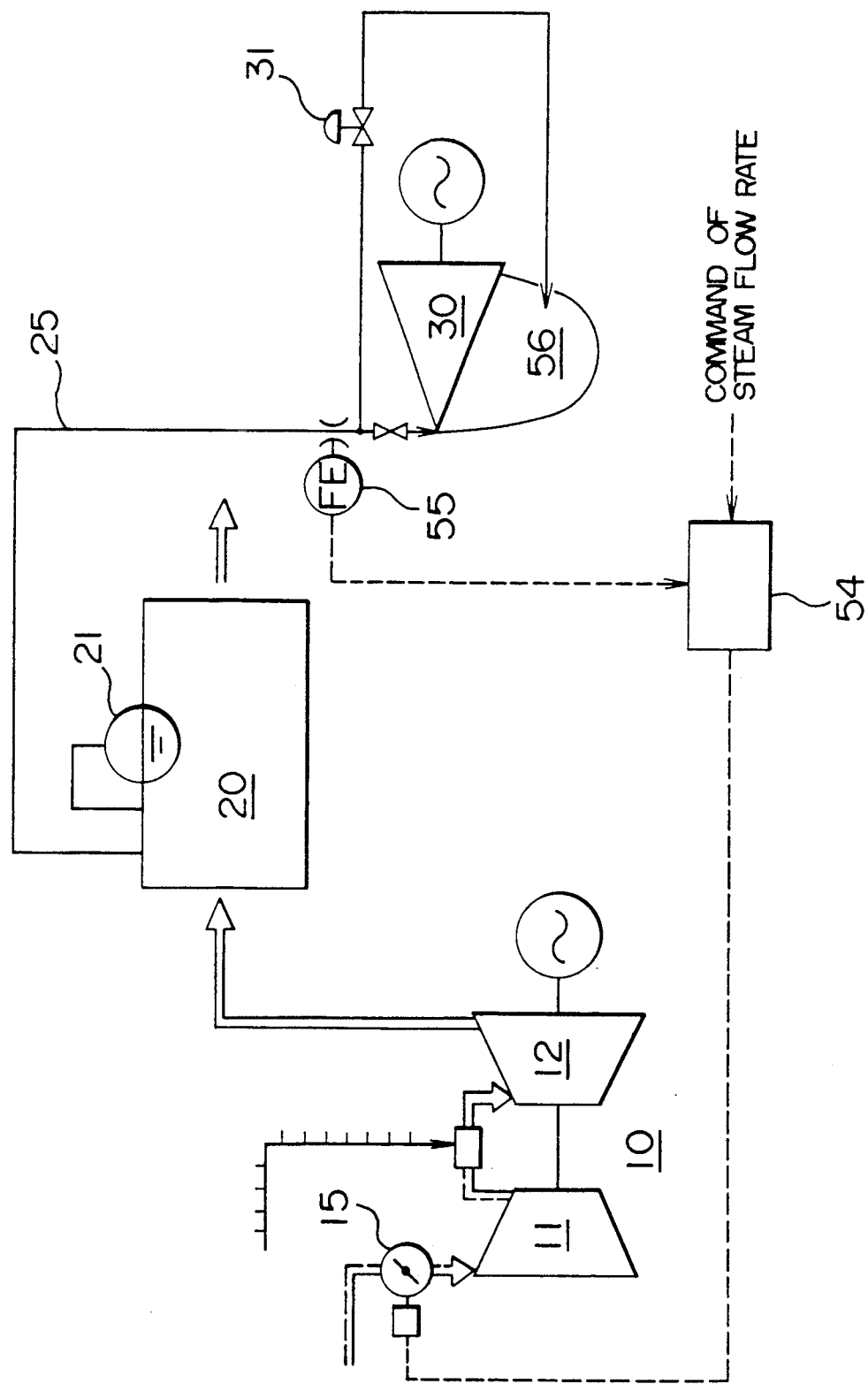
FIG. 15 is a schematic view of a further embodiment of the present invention in which the inlet guide vane opening is controlled such as to maintain the flow rate of turbine by-pass steam at a command value.

In FIG. 15, the rate of generation of steam in a heat-recovery boiler 20 is controlled by changing the opening of the inlet guide vane 15 of the gas turbine associated with this boiler. In this embodiment, therefore, a controller 54 operates in accordance with a signal from a flowmeter 55 provided in a steam pipe 25 so as to control the opening of the inlet guide vane to thereby obtain a required flow rate of the steam in the pipe 25.

In FIG. 15, a combined plant has a turbine by-pass system 57 which directly connects the steam pipe 25 leading from the waste-heat recovery boiler to a condenser 56 which liquefies the exhaust steam from the steam turbine so as to allow the steam to flow into the condenser 56 directly by-passing the steam turbine until the difference between the steam temperature and the turbine metal is reduced to a predetermined allowable level. According to the embodiment of FIG. 15, the temperature of the steam can be raised with the by-pass steam being restricted by a control valve 31 provided in the turbine by-pass system, so that the total amount of steam to be directly introduced into the condenser through the by-pass system can be reduced advantageously. This, in turn, enables the capacity of the turbine by-pass system to be decreased, thus realizing an economical and compact combined plant.

Figure 16:
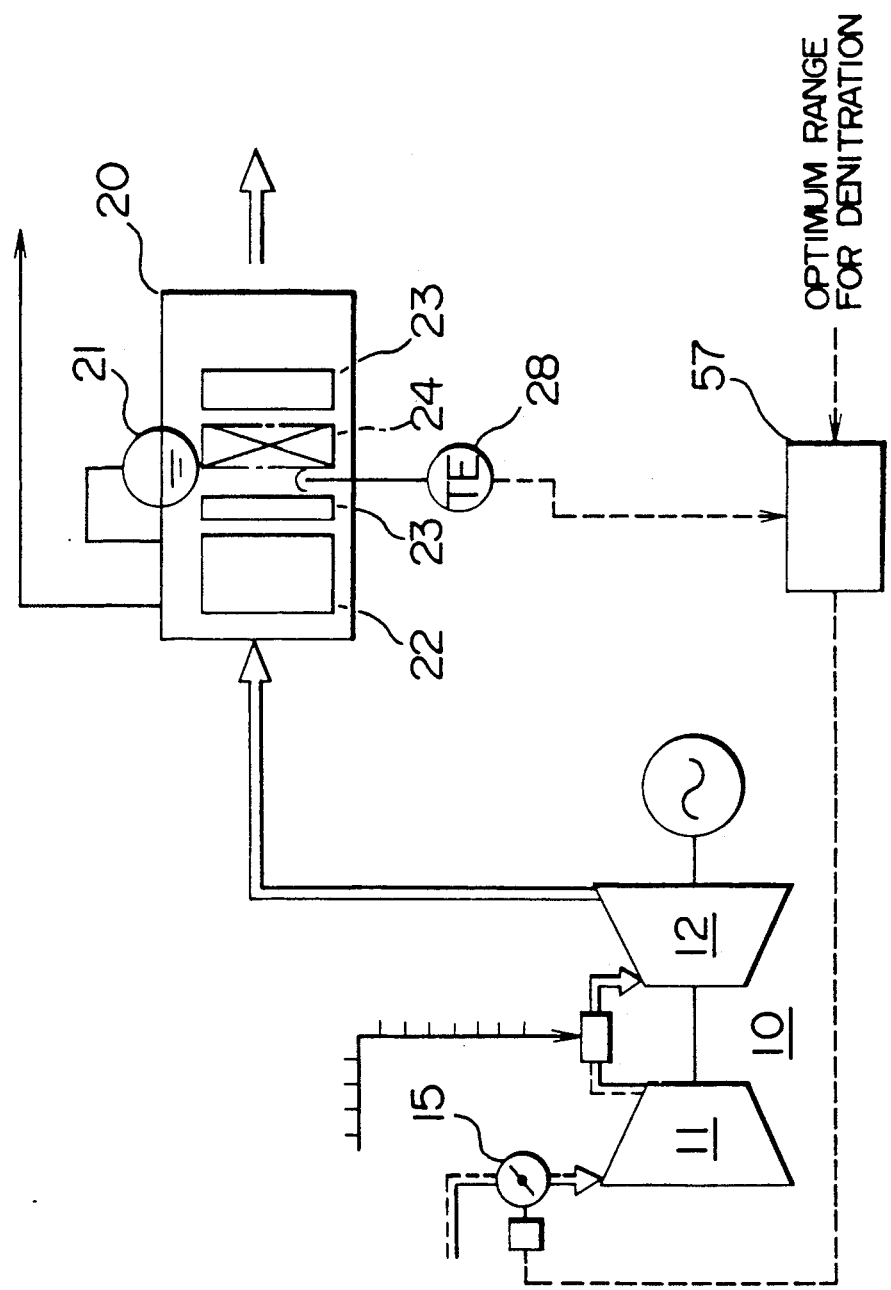
FIG. 16 is a schematic view of embodiment of the present invention in which the inlet guide vane opening is controlled so as to maintain the denitration catalyst temperature at a suitable level in a waste-heat recovery boiler.
Figure 17A:
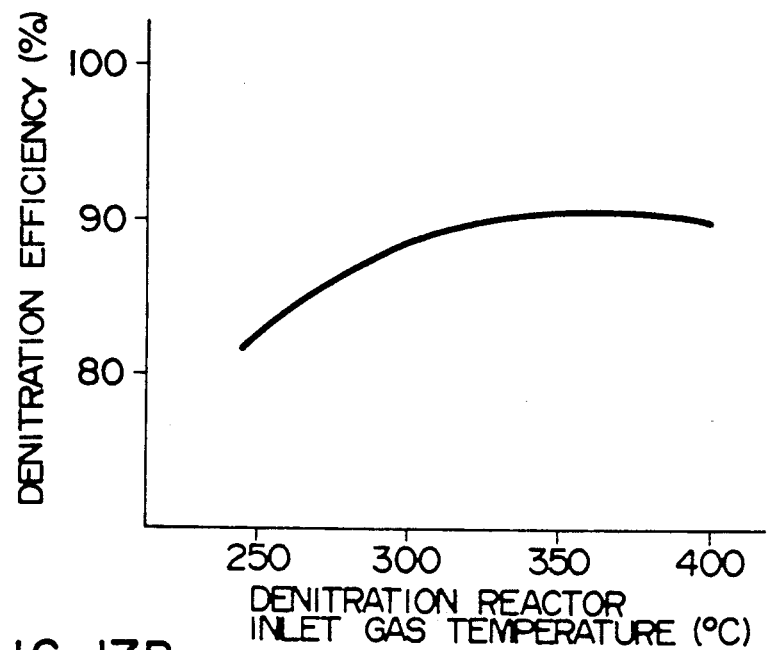
FIGS. 17A and 17B are graphical illustration showing the temperature characteristic of a denitration catalyst.

In FIG. 16, a waste-heat recovery boiler 20 associated with a gas turbine is provided with a denitration reactor 24 which is capable of removing nitrogen oxides (NOx) from the gas emitted from the gas turbine. The denitration efficiency of the denitration reactor has a dependency on the temperature of the gas flowing into the reactor 24. More specifically, the efficiency decreases as the gas temperature becomes lower, as shown in FIG. 17A.

Figure 17B:
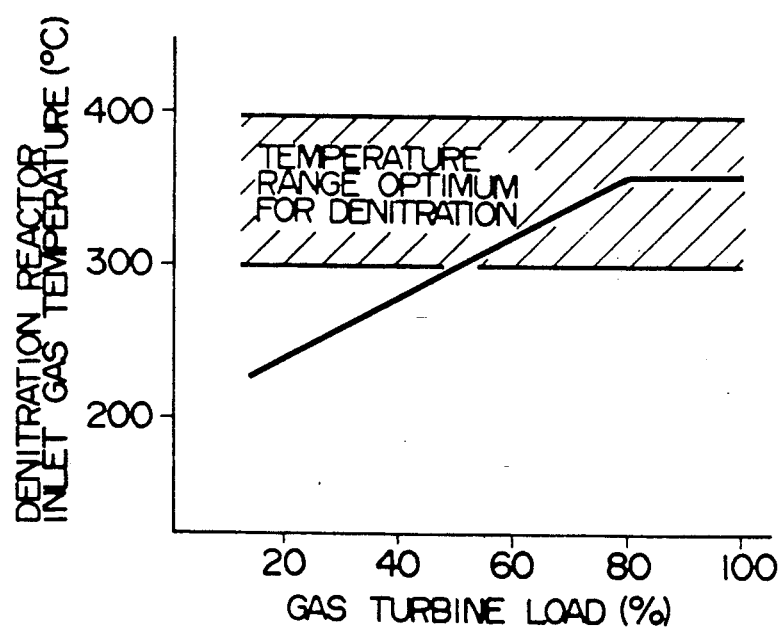

On the other hand, the temperature of the gas flowing into the denitration reactor 24 decreases as the level of the load on the gas turbine becomes lower as shown in FIG. 17B when the plant is controlled by the conventional method. Consequently, the denitration reactor 24 can operate effectively only in a limited range of the load applied to the gas turbine, e.g., in a load range above 50% load.

This problem is overcome by the embodiment shown in FIG. 16 because the inlet guide vane 15 of the gas turbine is controlled by a controller 57 in such a manner that the temperature of the gas flowing into the denitration reactor 24 is optimized for the denitration reaction performed by the denitration reactor 24. It is thus possible to maintain a high denitration efficiency over the entire range of the load applied to the gas turbine.

Figure 18A:
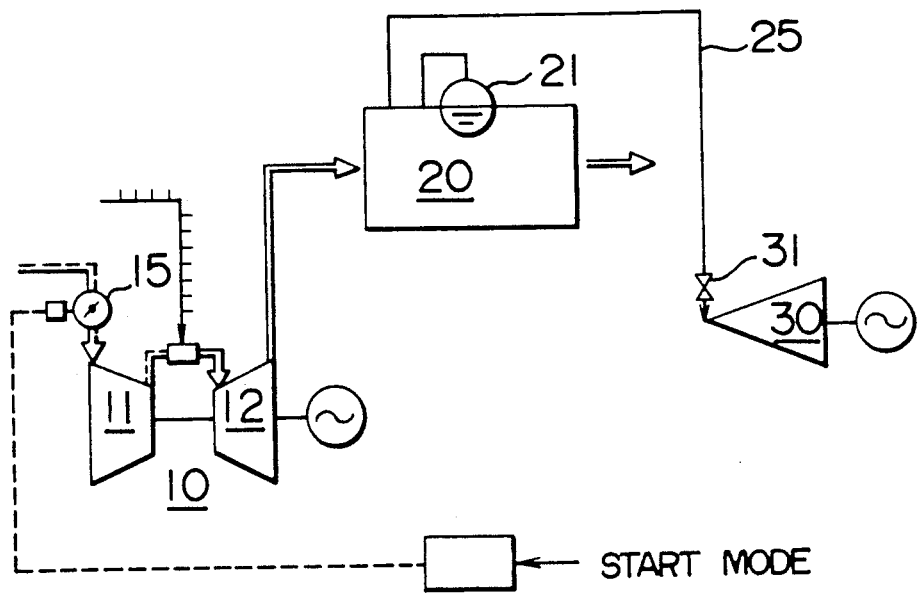
FIG. 18A is a schematic view of yet another embodiment of the present invention.
Figure 18B:
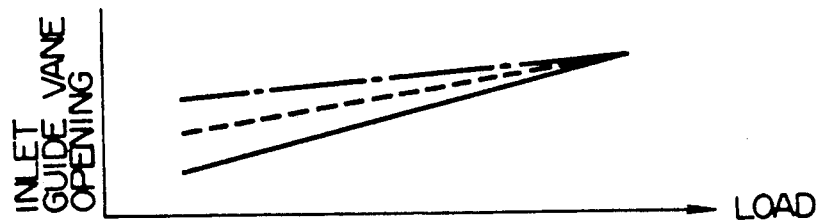
FIG. 18B is a graphical illustration of the inlet guide vane opening controlled in accordance with the mode of start up of a combined plant.

In FIG. 18, the opening of the inlet guide vane of the gas turbine is previously set in the form of a plurality of patterns as shown in FIG. 18B in accordance with a plurality of starting modes such as hot start, warm start and cold start. When the plant is started, the inlet guide vane of the gas turbine is controlled in accordance with one of the previously set patterns depending upon the mode in which the plant is started.

Figure 18C:
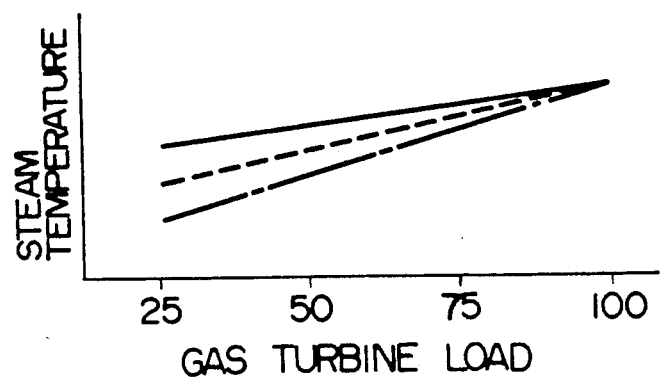
FIG. 18C is a graphical illustration of the steam temperature in accordance with the inlet guide vane opening in FIG. 18B.

For example, when the plant is hot-started, the rate of increase of the load is generally large so that the rate of change in the steam temperature tends to become correspondingly large. In order to reduce the rate of rise of the steam temperature, therefore, the inlet guide vane opening is controlled in accordance with the solid line in FIG. 18B when the plant is hot-started. Conversely, when the plant is cold-started, the gas load level on the gas turbine has to be maintained low for a comparatively long time, in order to obtain a matching between the steam temperature and the turbine metal temperature. This can be achieved by controlling the inlet guide vane opening in a manner shown by the chain line in FIG. 18C. In FIG. 18C, the broken-line curve shows the manner in which the inlet guide vane is controlled when the plant is started from a warm state. FIG. 18C shows the patterns in which the steam temperature rises in the respective starting modes.

The embodiments described hereinbefore may be executed independently or in combination. Examples of such combination will be described with reference to FIGS. 19 and 20.

FIG. 19 shows a combination of the embodiments shown in FIGS. 1 and 7. During normal operation of the plant, a controller 42 controls the inlet guide vane 15 such that the main steam temperature measured by the steam thermometer 41 coincides with the temperature set by the load-temperature setting device 45 over the entire range of the load applied to the gas turbine. However, when the plant is started up or when a rapid change in the load level is taking place, the inlet guide vane 15 is controlled in accordance with the signal from a thermal stress monitoring system 43 in such a manner that the thermal stress 30 is not produced in the steam turbine 30.

In general, the control of the inlet guide vane in the above-described manner is conducted by using a signal selector 46 in such a manner that the signal from the thermal stress monitoring system takes preference over the signal from the load-temperature setting device 45 when the plant is being started up or when a rapid change in the load level is taking place.

Figure 20:
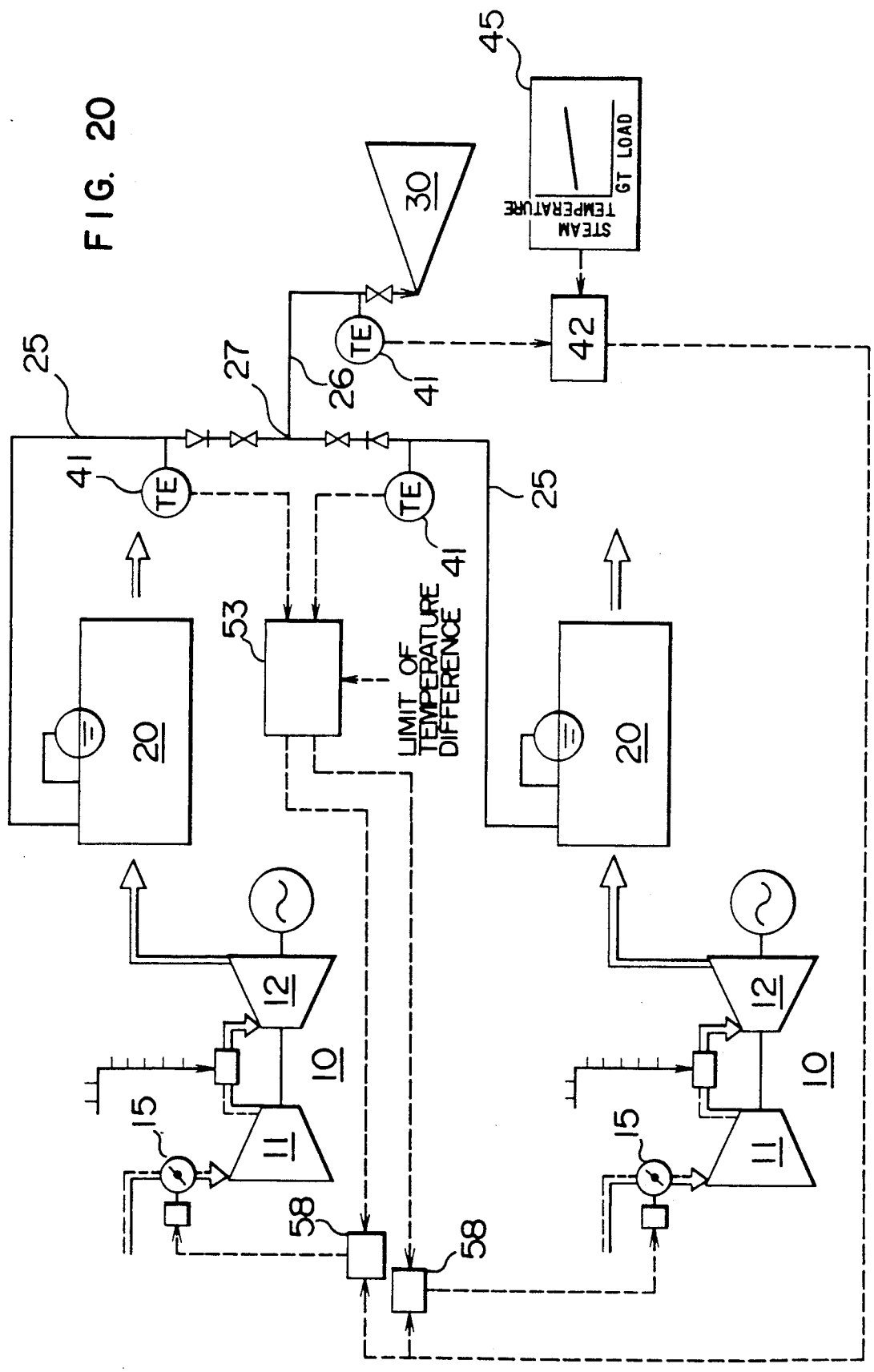

FIG. 20 shows a combination of the embodiment of FIG. 1 with the embodiment of FIG. 13 which is used for a multiple shaft type combined plant. In this case, the inlet guide vanes of a plurality of gas turbines in a multiple shaft type combined plant are simultaneously controlled such that the main steam temperature measured by the steam thermometer 41 coincides with the temperature which is previously set by the load-temperature setting device 45. In the event that different gas turbines operate at different load levels, a controller 53 operates to control the inlet guide vane of at least one of such gas turbines such that the difference of the steam temperature between the waste-heat recovery boilers does not exceed a predetermined limit value. To this end, a signal selector selects the signal representative of the steam temperature difference with a priority over the signal from the load-temperature setting device 45.

A combination of the embodiment shown in FIG. 1 and the embodiment shown in FIG. 7, as well as a combination of the embodiments of FIG. 1 and FIG. 13, has been described by way of example. It is to be understood, however, that the present invention does not exclude combination of two or more of the embodiments described hereinabove so as to realize an effective method for controlling a combined plant.

In a different application of the present invention, the inlet guide vane is controlled during a turbine-by-pass operation at the time of start-up of the combined plant such that the flow rate of the exhaust gas and, hence, the rate of generation of the steam from the waste-heat recovery boiler are reduced so that the temperature rise of the condenser cooling water caused by the by-pass operation may be maintained below a predetermined limit, with the result being that the waste of heat due to discharge of steam to the condenser through the turbine by-pass line is minimized. Consequently, the rate of rise of the condenser cooling water temperature during starting of a combined plant can be maintained within a limited range.

Figure 21:
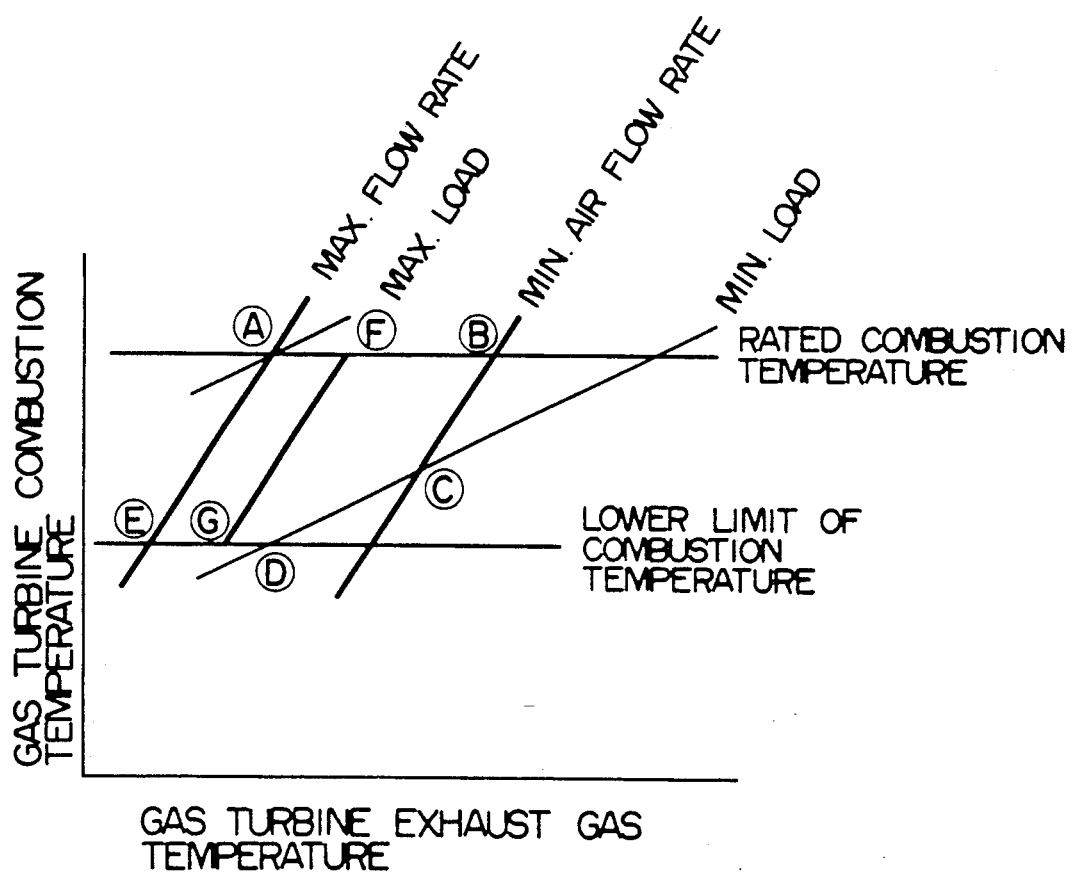
FIG. 21 is a graphical of the range of operation of the inlet guide vane.

FIG. 21 shows an example of the range over which a gas turbine is operable through the control of the inlet guide vane of the gas turbine.

The operation range is determined by the following factors:
   (1) maximum air flow rate at the compressor inlet
   (2) minimum air flow rate at the compressor outlet
   (3) maximum load which can be borne by the gas turbine
   (4) minimum load with which the gas turbine is operable
   (5) upper limit of the combustion temperature in the gas turbine (6) lower limit of the combustion temperature in the gas turbine Thus, in case of the embodiment shown in FIG. 14, operation is possible by controlling the inlet guide vane opening within a region which is defined by points A, B, C, D and E in FIG. 21.

In case of the conventional method, the inlet guide vane is operated along a line A–F–G. It will be realized how the region of operation by the inlet guide vane afforded by the invention is wide as compared with the case of the conventional method.

As will be understood from the foregoing description, according to the present invention, the rate of generation of the steam by a waste-heat recovery boiler associated with a gas turbine of a combined plant is controlled by controlling the inlet guide vane of the gas turbine in accordance with the processing amount of the water/steam side of the combined plant.

In consequence, the present invention offers the following advantages.

(1) To shorten the start-up time of a combined plant
(2) To improve the load changing rate in the combined plant
(3) To reduce thermal stresses in the waste-heat recovery boiler and the steam turbine so as to attain a longer life of the plant.

What is claimed is:

1. A method of operating a combined plant having a gas turbine system including a compressor into which air is introduced through an inlet guide vane, a combustor in which a fuel is burnt with the air compressed by said compressor, and a turbine into which the combustion gas is introduced to generate an output power, a waste heat recovery boiler which generates steam by the heat possessed by the combustion exhaust gas from said gas turbine system, and a steam turbine driven by the steam generated by said waste-heat recovery boiler, said method comprising the steps of:
  setting a temperature of the steam generated in the waste-heat recovery boiler in relation to a level of load on said gas turbine system; and
  controlling an opening of said inlet guide vane of the gas turbine system in accordance with a set temperature resulting from the setting step.

2. A method of operating a combined plant having a gas turbine system including a compressor into which air is introduced through an inlet guide vane, a combustor in which a fuel is burnt with the air compressed by said compressor, and a turbine into which the combustion gas is introduced to generate an output power, a waste-heat recovery boiler which generates steam by the heat possessed by the combustion exhaust gas from said gas turbine system, and a steam turbine driven by the steam generated by said waste-heat recovery boiler, said method comprising: setting the temperature of the steam flowing into said steam turbine in relation to the level of the load on said gas turbine system and controlling the opening of said inlet guide vane in accordance with the set temperature.

3. A method of operating a combined plant composed of a gas turbine system including a compressor into which air is introduced through an inlet guide vane, a combustor in which a fuel is burnt with the air compressed by said compressor, and a turbine into which the combustion gas is introduced to generate an output power, a waste-heat recovery boiler which generates steam by the heat possessed by the combustion exhaust gas from said gas turbine system, and a steam turbine driven by the steam generated by said waste-heat recovery boiler, said method comprising: controlling the opening of said inlet guide vane of said gas turbine system in such a manner as to maintain the temperature of the steam flowing into said steam turbine below a predetermined level.

* * * * *